United States Patent
Swinderman

(10) Patent No.: US 6,695,131 B2
(45) Date of Patent: Feb. 24, 2004

(54) CATENARY CONVEYOR BELT SUPPORT APPARATUS

(75) Inventor: R. Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/935,250

(22) Filed: Aug. 22, 2001

(65) Prior Publication Data

US 2002/0046928 A1 Apr. 25, 2002

Related U.S. Application Data

(60) Provisional application No. 60/228,706, filed on Aug. 29, 2000.

(51) Int. Cl.$^7$ ............................................... B65G 15/08
(52) U.S. Cl. ........................................ 198/827; 198/841
(58) Field of Search ................................. 198/827, 841

(56) References Cited

U.S. PATENT DOCUMENTS

| | | | |
|---|---|---|---|
| 1,371,290 A | | 3/1921 | Armstrong |
| 3,087,601 A | | 4/1963 | Lo Presti |
| 3,273,694 A | * | 9/1966 | Joslin .......................... 198/129 |
| 3,360,105 A | * | 12/1967 | Pelzer ......................... 198/129 |
| 4,932,516 A | * | 6/1990 | Andersson .................. 198/823 |
| 4,936,443 A | * | 6/1990 | East ............................. 198/827 |
| 5,318,170 A | | 6/1994 | Kokolis |
| 5,341,920 A | | 8/1994 | Riffe |
| 5,341,921 A | | 8/1994 | Kokolis |
| 5,564,557 A | | 10/1996 | Spencer |
| 5,590,757 A | | 1/1997 | Walter et al. |
| 5,762,179 A | | 6/1998 | Oury et al. |
| 5,799,780 A | * | 9/1998 | Steeb, Jr. et al. ........... 198/823 |
| 5,826,703 A | * | 10/1998 | Altemum, Jr. et al. ...... 198/823 |
| 5,927,478 A | * | 7/1999 | Archer ........................ 198/823 |
| 5,988,360 A | * | 11/1999 | Mott ........................... 198/823 |
| 6,109,428 A | * | 8/2000 | Harm .......................... 198/841 |
| 6,237,753 B1 | * | 5/2001 | Walter et al. ............... 198/824 |
| 6,244,428 B1 | * | 6/2001 | Atkins ........................ 198/823 |
| 6,293,389 B1 | * | 9/2001 | Knapp et al. ............... 198/823 |
| 6,382,402 B1 | * | 5/2002 | Habberley ................... 198/823 |
| 6,454,083 B2 | * | 9/2002 | Burkhart et al. ............ 198/823 |

* cited by examiner

Primary Examiner—Christopher P. Ellis
Assistant Examiner—Rashmi Sharma
(74) Attorney, Agent, or Firm—Barnes & Thornburg

(57) ABSTRACT

A catenary conveyor belt support apparatus for supporting a conveyor belt having a first edge and second edge. The support apparatus includes a first support block having a top surface for supporting the conveyor belt at the first edge and a second support block having a top surface for supporting the conveyor belt at the second edge. First and second idler strings extend between and are connected to the first and second support blocks. Each idler string includes one or more idler rollers for supporting the conveyor belt. A pair of resilient biasing members are respectively attached at a first end to each idler string and at a second end to an anchor member. The support blocks and the resilient biasing members inhibit misalignment of the idler rollers and movement of the first and second edges of the conveyor belt to reduce the escape of conveyed material from the conveyor belt.

19 Claims, 7 Drawing Sheets

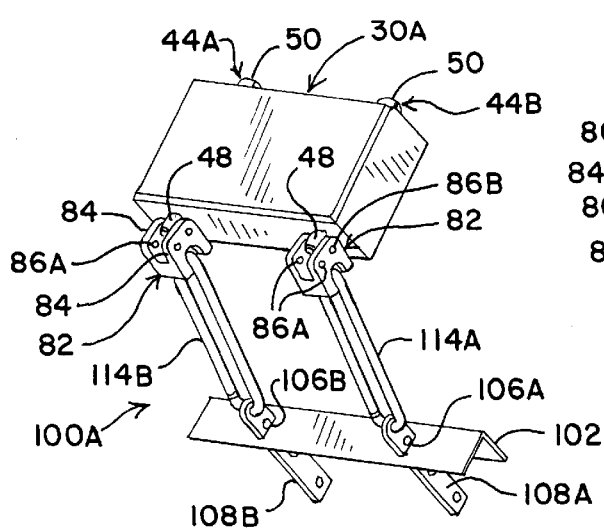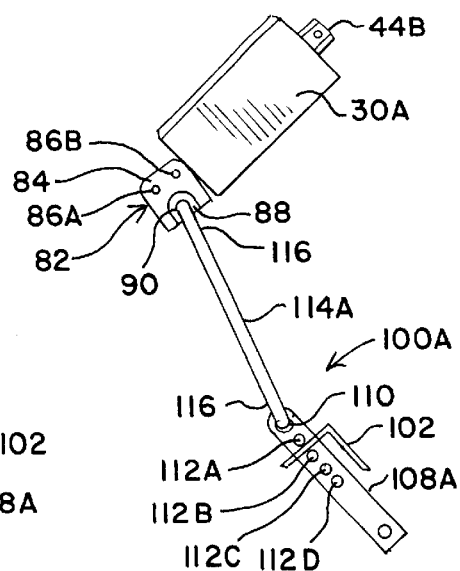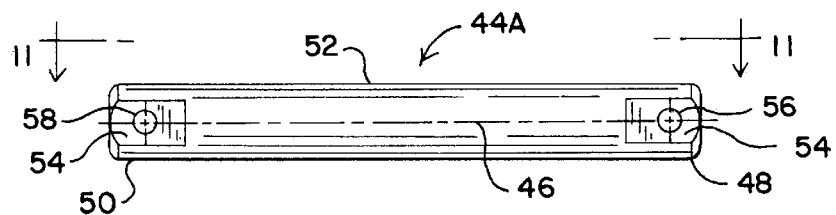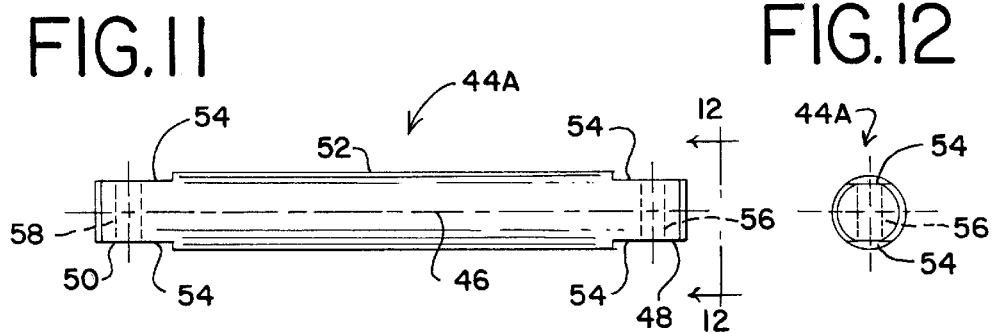

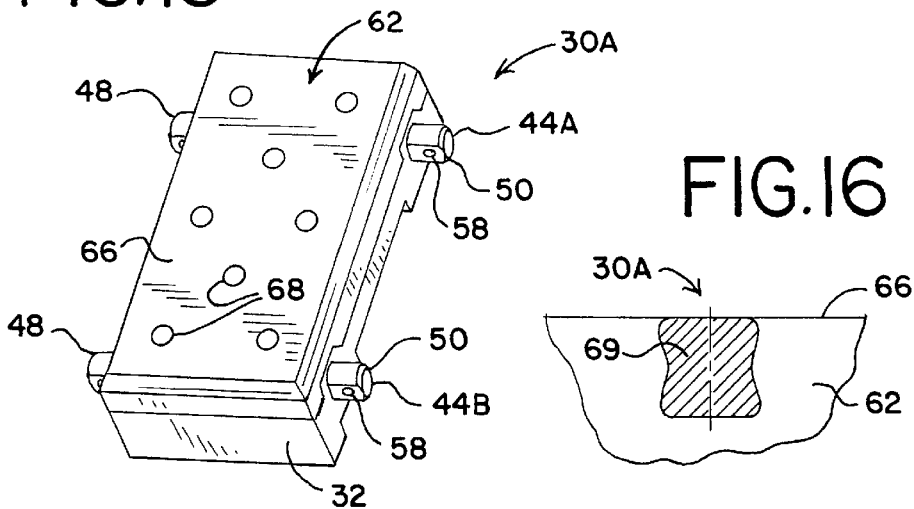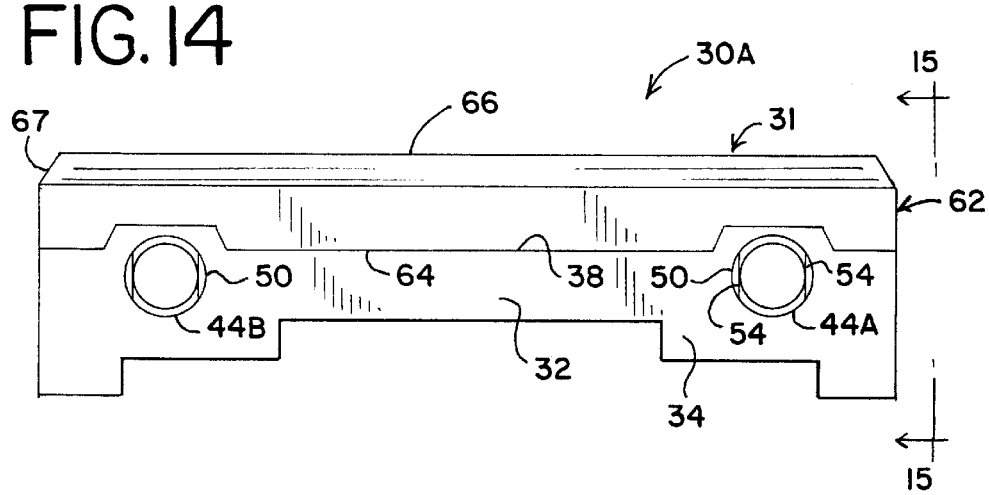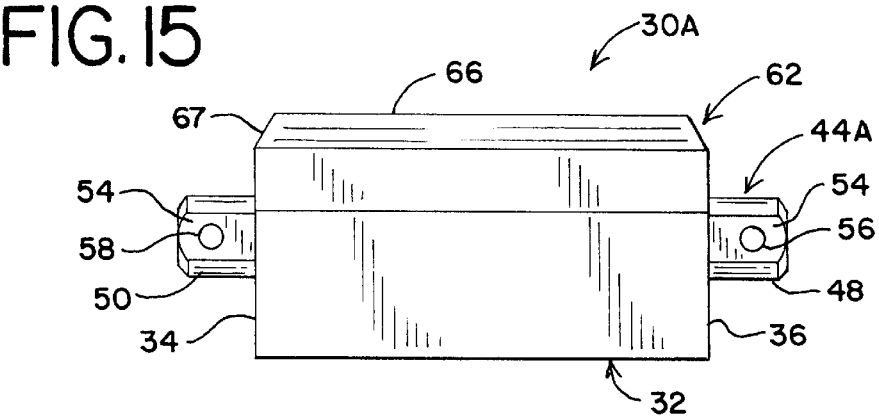

CATENARY CONVEYOR BELT SUPPORT APPARATUS

RELATED APPLICATIONS

This application claims the benefit of U.S. Provisional Application No. 60/228,706, filed Aug. 29, 2000.

BACKGROUND OF THE INVENTION

The present invention is directed to a high impact catenary conveyor belt support apparatus which is adapted to support a conveyor belt in the load or impact zone, and in particular to a catenary conveyor belt support apparatus which includes two spaced apart support blocks and one or more strings of idler rollers extending between the support blocks whereby the support blocks limit movement of the side edges of the conveyor belt to facilitate sealing of the edges of the conveyor belt against escape of the conveyed material and whereby the support apparatus reduces mistracking of the conveyor belt.

In heavy-duty bulk material conveying applications it is common practice to use catenary idler rollers to support a conveyor belt in the load or impact zone because large impact forces are applied to the belt when the material being loaded is dropped onto the belt. Typical heavy-duty conveying applications include open pit mining conveyors, bucket wheel excavator conveyors, and underground mining conveyors. Typical belt widths range from four feet to twelve feet. Belt speeds range from 500 to 2,000 feet per minute. The tonnage carried by the conveyor belts can be as high as 40,000 tons per hour. The conveyor belts may convey material that includes refrigerator size rocks, clay and logs. The ability of catenary idlers to absorb impact forces is greater than the ability of conventional fixed idler rollers or conventional fixed impact idlers to do so, as catenary idlers are free to move like a string of beads and are often suspended at each end on springs. Catenary support idlers are usually designed for rapid replacement as breakage and damage may occur from exceptionally large impact forces or extreme use.

The primary benefit of a catenary idler is also its main drawback as movement of the idler rollers, which aids in the ability to absorb impact forces, causes the side edges of the belt to move. Movement of the side edges of the conveyor belt by several inches in all directions during loading is common making the load zone of the conveyor impossible to seal such that material being loaded onto the belt spills over the side edges of the belt. Conveyor belts that are subject to heavy impact forces and that are supported by catenary idlers also previously tracked poorly in the load zone because the impact forces are absorbed partially by movement of the idler rollers in an idler string. Movement of the idler rollers can be extreme when large items, such as rocks which may exceed three feet in diameter, strike near the edge of the conveyor belt and push the belt away from the longitudinal center line of the conveyor. Mistracking of the conveyor belt is fostered by idler rollers that become skewed by these impact forces and the tremendous contact pressures that result. There is a great deal of conveyor belt mistracking due to the unstable nature of catenary idler rollers. The present invention provides the impact absorption benefits of a catenary idler apparatus plus the ability to reduce movement of the side edges of the conveyor belt to reduce the escape of fugitive material and the ability to inhibit misalignment of the idler rollers to prevent mistracking of the conveyor belt.

SUMMARY OF THE INVENTION

A catenary conveyor belt support apparatus for supporting a conveyor belt having a first edge and a second edge. The conveyor belt support apparatus includes the first support block having a top surface for supporting the conveyor belt at the first edge of the conveyor belt and a second support block having a top surface for supporting the conveyor belt at the second edge of the conveyor belt. The second support block is spaced apart from the first support block. A first idler string includes a first end attached to the first support block and a second end attached to the second support block, such that the first idler string extends between and is attached to the first and second support blocks. The first idler string includes one or more idler rollers for supporting the conveyor belt. The second idler string includes a first end attached to the first support block and a second end attached to the second support block. The second idler string thereby extends between and is attached to the first and second support blocks and is substantially parallel to the first idler string. The second idler string includes one or more idler rollers for supporting the conveyor belt. Each support block includes a support body and first and second shafts extending through the support body. Each end of each support shaft includes a connector member that is located outside of the support body. The connector members are adapted for attachment to the idler strings or to a support structure. The support body may be formed from a single block, from a bottom member and a top member, or from a plurality of slabs located adjacent to one another.

The conveyor belt support apparatus may include one or more restraining assemblies for resiliently connecting an idler string to an anchor member. The restraining assembly includes a coupler member adapted to be attached to an idler string and a resilient biasing member, such as a tether formed from a shock cord, having a first end and a second end. The first end of the biasing member is attached to the coupler member. A connector member is attached to the second end of the biasing member which includes a plurality of attachment points for selectively connecting the connector member to the anchor member. Movement of the idler rollers is restricted by the first and second support blocks and by the restraining assemblies to inhibit misalignment of the idler rollers. The support blocks and restraining assemblies also inhibit movement of the first and second edges of the conveyor belt to reduce the escape of conveyed material from the conveyor belt.

BRIEF DESCRIPTION OF THE DRAWING FIGURES

FIG. 8 is a perspective view of a support block and restraining assembly of the catenary conveyor belt support apparatus.

FIG. 9 is a side elevational view of the support block and restraining assembly.

FIG. 10 is a plan view of the shaft of a support block.

FIG. 11 is a side elevational view of the shaft taken along line 11—11 of FIG. 10.

FIG. 12 is an end view of the shaft taken along line 12—12 of FIG. 11.

FIG. 13 is a perspective view of a support block.

FIG. 14 is a front elevational view of a support block.

FIG. 15 is a side elevational view of a support block taken along line 15—15 of FIG. 14.

FIG. 16 is a partial cross sectional view of a support block including a wear-resistant insert.

DETAILED DESCRIPTION OF THE PREFERRED EMBODIMENTS

Figure 3:
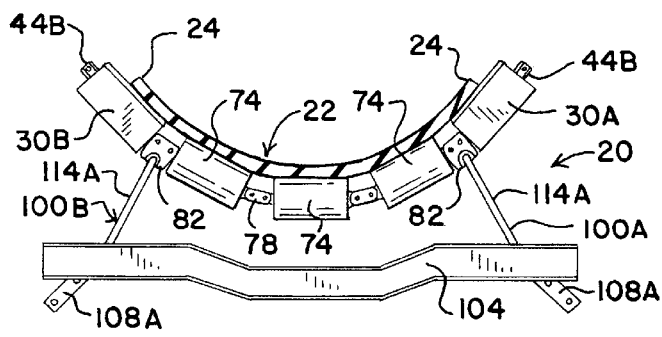
FIG. 3 is a front elevational view of the catenary conveyor belt support apparatus.
Figure 4:
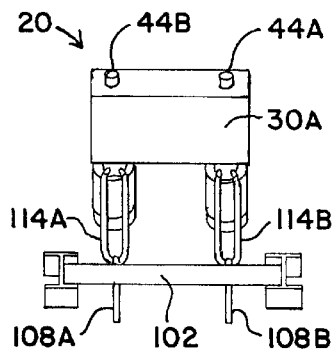
FIG. 4 is a side elevational view of the catenary conveyor belt support apparatus.

The catenary conveyor belt support apparatus 20 is adapted to support a moving conveyor belt 22, as shown in FIG. 3, in the load zone of a conveyor. The conveyor belt 22 includes a bottom surface and a top load carrying surface which extend between generally parallel and linear side edges 24 of the conveyor belt 22. The support apparatus 20 is adapted to be positioned beneath the load carrying run of the conveyor belt 22 in supporting engagement with the bottom surface of the conveyor belt 22.

The support apparatus 20 includes a first support block member 30A and a second support block member 30B which are constructed substantially identical to one another. The support block 30A is best shown in FIGS. 13–15. The support block 30A includes a support body 31. The support body 31 includes a base member 32 having a front face 34, a rear face 36 and a top surface 38. A first shaft 44A and a second shaft 44B extend through the base member 32 and project outwardly from the front face 34 and the rear face 36. The shaft 44A, as best shown in FIGS. 10–13, includes a central longitudinal axis 46 that extends between a first end 48 and a second end 50 of the shaft 44A. The shaft 44A includes a generally cylindrical center portion 52 having an outer cylindrical surface. Each end 48 and 50 includes a connector member. Each end 48 and 50 includes two spaced apart planar surfaces 54 that are generally parallel to one another. A generally cylindrical bore 56 extends through the first end 48 of the shaft 44A generally perpendicular to and between the planar surfaces 54. A generally cylindrical bore 58 extends through the second end 50 of the shaft 44A generally perpendicular to and between the planar surfaces 54. The bores 56 and 58 are spaced apart and parallel to one another. The shaft 44A is preferably made from metal such as steel. The shaft 44B is constructed substantially identical to the shaft 44A.

The shafts 44A–B, including the center portion 52, need not be cylindrical in cross section and may be formed in various other cross sectional shapes including polygonal shapes such as a rectangle. Each shaft 44A–B needs to be at least as strong as an idler roller in the support apparatus 20, and the connector member at each end of the shaft 44A–B needs to be compatible to connect to an idler roller. A shaft 44A–B including a polygonal cross sectional shape may interlock with the support body 31 better than a shaft 44A–B having a cylindrical configuration. The shafts 44A–B may each have one or more apertures located between the ends of the shafts such that the cast material that forms the support body 31 will fill the apertures thereby interlocking the shafts 44A–B with the support body 31.

As best shown in FIGS. 13 and 15, the shafts 44A and B extend through the base member 32 such that the first ends 48 project outwardly from the rear face 36 and the second ends 50 project outwardly from the front face 34. The shafts 44A and B are spaced apart and parallel to one another. The bore 56 in the shaft 44A is located generally coaxially with the bore 56 in the shaft 44B. The bore 58 in the shaft 44A is located generally coaxially with the bore 58 in the shaft 44B.

As best shown in FIGS. 13–15, the support body 31 of the support block 30A includes a top member 62. The top member 62 includes a bottom surface 64 that is adapted to conform to and mate with the top surface 38 of the base member 32. The top member 62 also includes a top surface 66 that is adapted to slidably engage and support the conveyor belt 22 at its side edges 24. The top member 62 preferably includes chamfered edges 67 between the top surface 66 and the side walls of the top member 62. The chamfered edge 67 assists in guiding the belt 22 back onto the top surface 66 if the belt 22 mistracks sufficiently to come off of the top surface 66. The top member 62 may include a plurality of apertures 68 that extend from the top surface 66 to the bottom surface 64. The apertures 68 may be V-shaped or countersunk.

The top member 62 of the support block 30A may be formed or cast from a low friction and/or wear resistant material such as ultra high molecular weight (UHMW) polyethylene or polyurethane. The base member 32 of the support block 30A may be formed or cast from impact absorbing materials such as rubber or urethane. The top member 62 can be attached to the base member 32 by casting the material of the base member 32 into the apertures 68 of the top member 62. Alternatively, bolts or screws can extend through the apertures 68 in the top member 62 to removably attach the top member 62 to the base member 32.

The top member 62 may alternatively be formed from an impact absorbing material such as urethane or rubber. The base member 32 and the top member 62 can alternatively be formed integrally with one another as a solid block, and from a single material such as rubber, urethane, ultra high molecular weight polyethylene, polyurethane or nylon. In order to improve wear and/or reduce friction, the support blocks may include a plurality of wear-resistant inserts 69 as shown in FIG. 16 which form a portion of the surface 66. The inserts 69 may be generally cylindrical buttons, elongate strips or plates of a wear-resistant ceramic, metal or plastic material. Additives such as carbon or glass fibers may be added to the materials that form the support blocks to improve wear and/or reduce friction. Support blocks made from polyurethane can be re-manufactured by molding new polyurethane onto worn polyurethane surfaces. The support blocks 30A–B can be made symmetrical such that when one surface becomes worn through sliding engagement with the conveyor belt, the support block can be rotated one hundred eighty degrees and reinstalled to provide a fresh support surface for supporting the conveyor belt.

Figure 1:
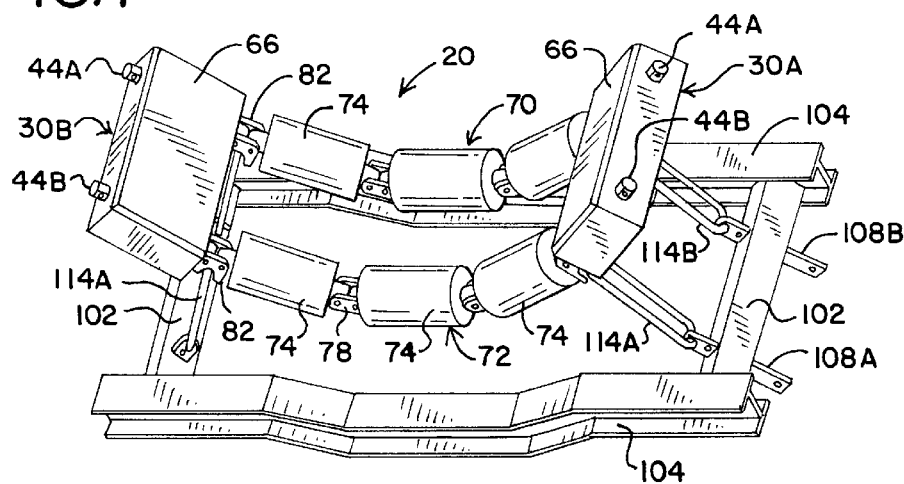
FIG. 1 is a perspective view of the catenary conveyor belt support apparatus of the present invention.
Figure 2:
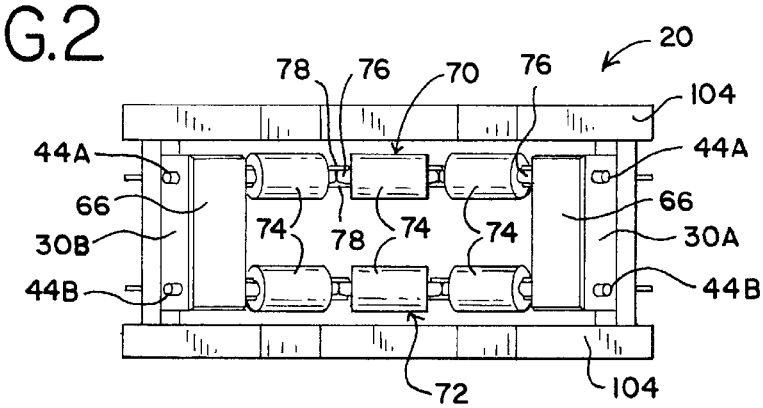
FIG. 2 is a top plan view of the catenary conveyor belt support apparatus.

As best shown in FIGS. 1 and 2, the support apparatus 20 also includes a first idler string 70 and a spaced apart and generally parallel second idler string 72. Each idler string 70 and 72 includes a plurality of generally cylindrical rotatable idler rollers 74 that are adapted to rotatably support the belt 22. Each idler roller 74 is rotatable about its central axis and about a shaft 76 which is constructed substantially identical to the shafts 44A and B. The end of each shaft 76 of an idler roller 74 is pivotally attached to the end of the shaft 76 of an adjacent idler roller 74 by a pair of link members 78 and by pins or bolts that extend through the link members 78 and the bores in the ends of the shafts 76. The shaft 76 at one end of the idler string 70 is pivotally attached to the first end 48 of the shaft 44A of the support block 30B by a coupler member 82, and the shaft 76 at the opposite end of the first idler string 70 is pivotally attached to the first end 48 of the shaft 44A of the support block 30A by a coupler member 82. The shafts 76 at the ends of the second idler string 72 are similarly respectively attached to the first ends 48 of the shafts 44B of the support blocks 30A and 30B by coupler members 82. The first end of each idler string 70 and 72 is thereby attached to the support block 30A and the second end of each idler string 70 and 72 is attached to the support block 30B. The first idler string 70 and the second idler string 72 thereby extend between and are attached to the support blocks 30A and 30B and are spaced apart and parallel to one another. Two or more idler strings may be attached to one pair of support blocks 30A–B. Each support block may include two or more shafts such that each idler string may be attached to a respective shaft in each support block.

Figure 24:
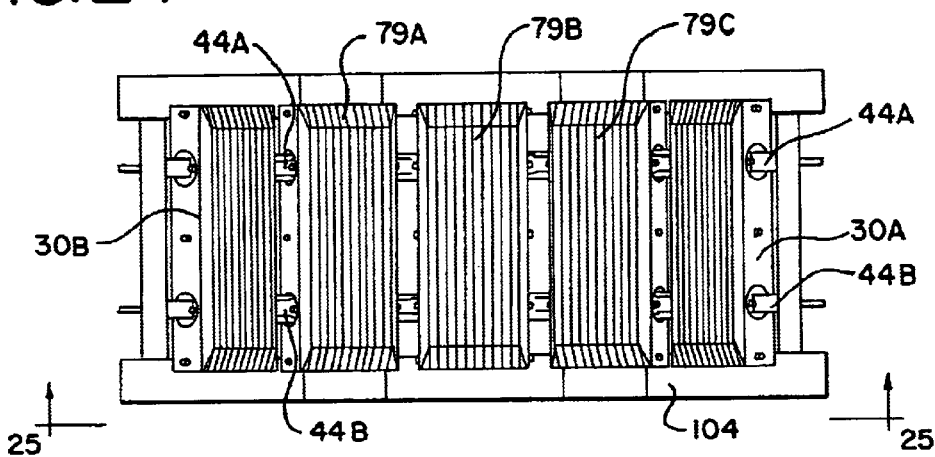
FIG. 24 is a top plan view of another embodiment of the catenary conveyor belt support apparatus.
Figure 25:
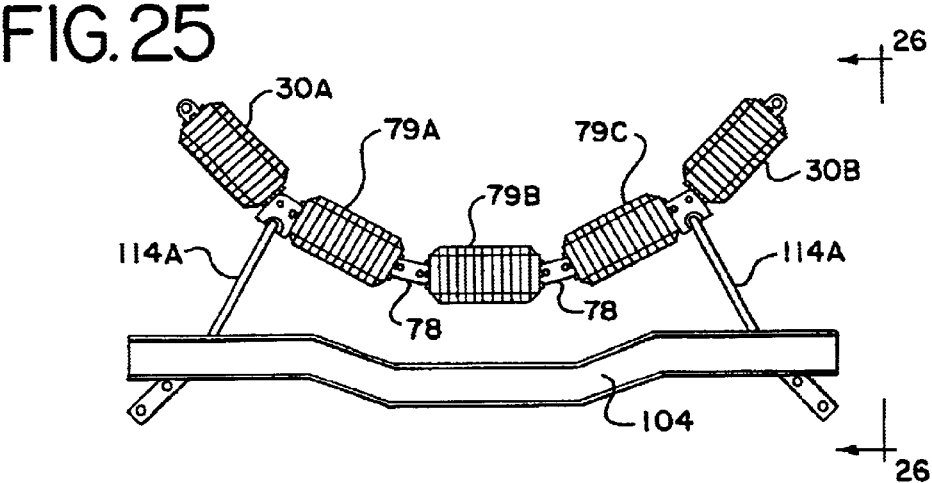
FIG. 25 is a front elevational view of the catenary conveyor belt support apparatus of FIG. 24.
Figure 26:
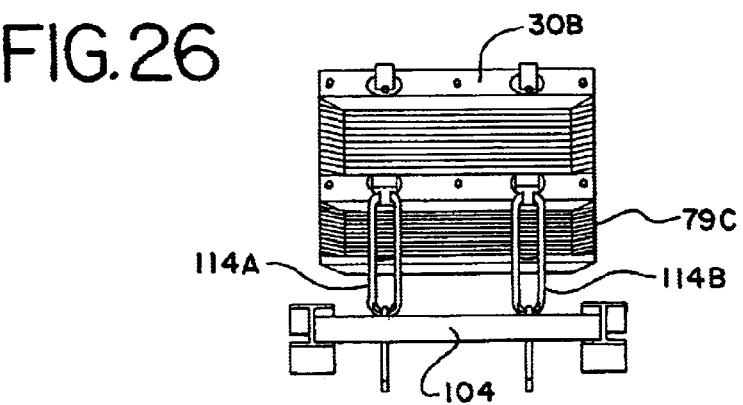
FIG. 26 is a side elevational view of the catenary conveyor belt support apparatus of FIG. 24.

Alternatively, as shown in FIGS. 24–26, the support apparatus 20 may include one or more inside support blocks 79A–C, that may be constructed in the same manner as the support blocks 30A–B, suspended between and supported by the outside support blocks 30A and 30B. In this arrangement an inside support block 79A–C respectively replaces each idler roller 74 in two or more adjacent idler strings. For example, three inside support blocks 79A–C would replace the three idler rollers 74 in the idler strings 70 and 72 as shown in FIG. 2. The shafts 44A–B of adjacent inside support blocks 79A–C are pivotally attached to one another by link members 78 and the shafts 44A–B of the inside support blocks 79A–C are pivotally attached to the shafts 44A–B of the outside support blocks 30A–B. The outside support blocks 30A–B support the edges 24 of the conveyor belt 22 and the inside support blocks 79A–C support the conveyor belt 22 between the outside support blocks 30A–B.

Figure 5:
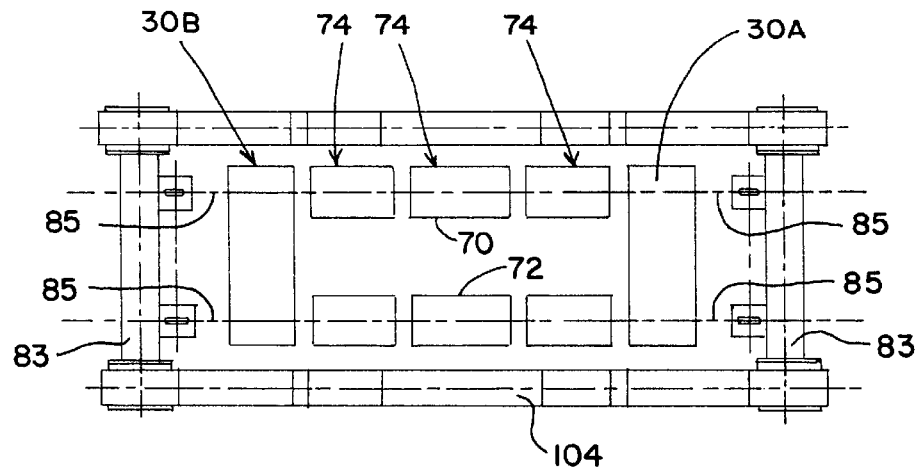
FIG. 5 is a top plan view showing the catenary conveyor belt support apparatus suspended by a stationary support structure.
Figure 6:
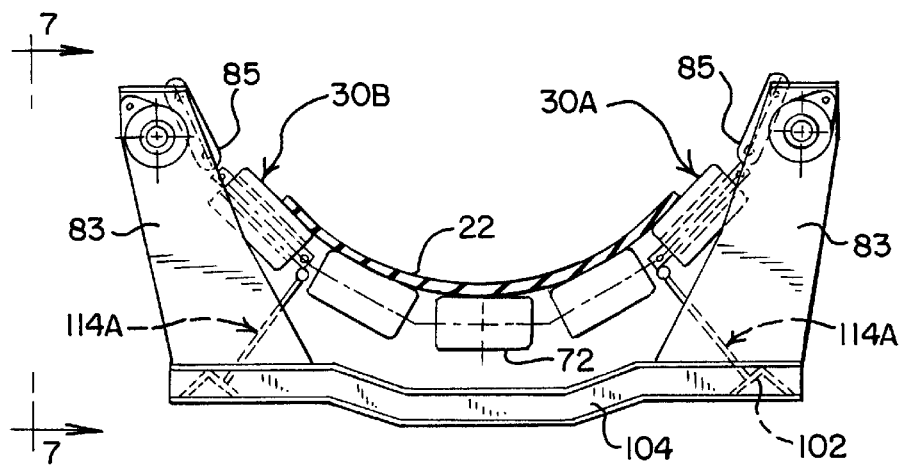
FIG. 6 is a front elevational view of the support apparatus of FIG. 5.
Figure 7:
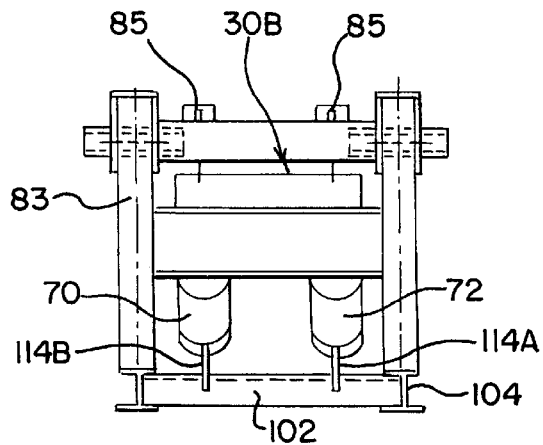
FIG. 7 is a side elevational view taken along line 7—7 of FIG. 6.

The second ends 50 of the shafts 44A–B of the support blocks 30A–B are adapted to be pivotally attached to a stationary support structure 83 by link members 85, as shown in FIGS. 5–7, such that the support blocks 30A–B and the first and second idler strings 70 and 72 are suspended in a catenary manner below and in supporting engagement with the bottom surface of the load carrying run of the conveyor belt 22. The support blocks 30A–B may alternatively be attached to the support structure 83 by shackles, turnbuckles, chains, springs, or the like.

The coupler member 82, as best shown in FIGS. 8 and 9, includes two spaced apart and parallel upwardly extending flanges 84. Each flange 84 includes two apertures 86A and B. The apertures 86A in the respective flanges 84 are located coaxially with one another and the apertures 86B in the respective flanges 84 are located coaxially with one another. Each coupler member 82 is pivotally attached to a respective shaft 44A or B by a fastener such as a pin or bolt which extends through the apertures 86B in the flanges 84 and through the bore 56 in the first end 48 of the shaft 44A or B. The coupler member 82 also includes a downwardly extending flange 88 having a bore 90. The downwardly extending flange 88 is located below the upwardly extending flanges 84 and generally mid-way between the flanges 84. The shaft 76 at each end of the first idler string 70 and at each end of the second idler string 72 are similarly pivotally attached to a coupler member 82 by a fastener such as a pin or bolt which extends through the apertures 86A of the flanges 84 and the bore at the end of the shaft 76.

The support apparatus 20 includes a restraining assembly 100A and a restraining assembly 100B. The restraining assembly 100A is best shown in FIGS. 8 and 9. The restraining assembly 100A includes an anchor member 102 such as an angle iron or a plate. Each end of the anchor member 102 is adapted to be attached to a stationary member 104. The stationary member 104 may be attached to and form part of the support structure 83. The anchor member 102 includes spaced apart slotted apertures 106A and B. The restraining assembly 100A also includes connector members such as elongate tongue members 108A–B. Each tongue member 108A and B includes an aperture 110 at one end and a plurality of attachment points such as apertures 112A–D that are spaced apart from one another along the central axis of the tongue member. Each tongue member 108A–B is adapted to be inserted through a respective slot 106A–B in the anchor member 102.

The restraining assembly 100A also includes resilient biasing members 114A–B such as resilient tethers. As shown in the drawing figures, the biasing members 114A–B are loops of resilient shock cord. A first end of the biasing member 114A is attached to the end of the tongue 108A by extending through the aperture 110. A second end of the biasing member 114A is attached to the downwardly extending flange 88 of the coupler member 82 that is attached to the shaft 44B by extending through the bore 90 in the flange 88. The biasing member 114B is similarly attached at each end respectively to the tongue member 108B and to the flange 88 of coupling member 82 that is attached to the shaft 44A. The terminal ends of the shock cord may be attached to one another by the use of one or more wire rope clips to form a loop. A rope thimble 116 extends through the aperture 110 in each of the tongue members 108A–B to protect the shock cord from being damaged by the tongue member. A rope thimble 116 extends through the bore 90 in the coupler members 82 to similarly protect the shock cord from being damaged by the flange 88. The biasing members 114A and B may alternatively be formed as resilient springs, bands or other resilient tether members. The ends of the biasing members 114A–B may alternatively be connected to the tongues 108A–B and to the coupler members 82 by fasteners such as bolts, shackles or turnbuckles. The restraining assembly 100B is constructed in the same manner as the restraining assembly 100A and is attached to the coupler members 82 that are attached to the support block 30B.

The biasing members 114A and B are respectively tensioned by moving the tongue members 108A–B downwardly through the slots 106A–B in the anchor member 102 until the desired biasing force is created in the biasing members 114A–B. A fastener such as a pin or bolt is then inserted through whichever aperture 112A–D is located closest to the anchor member 102 on the opposite side from the biasing member 114A–B. The fasteners thereby prevent the tongue members 108A–B from moving through the slots 106A–B toward the coupler member 82 and support block 30A–B.

Figure 17:
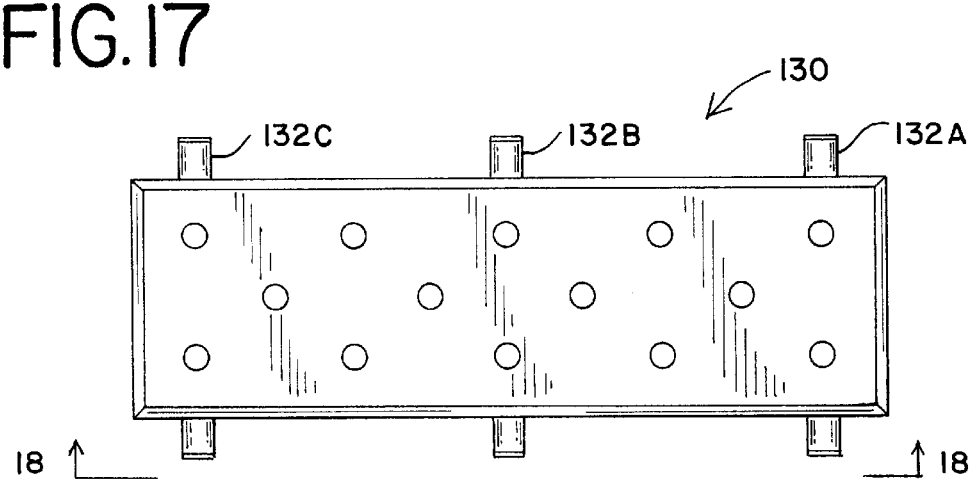
FIG. 17 is a top plan view of a modified embodiment of a support block.
Figure 18:
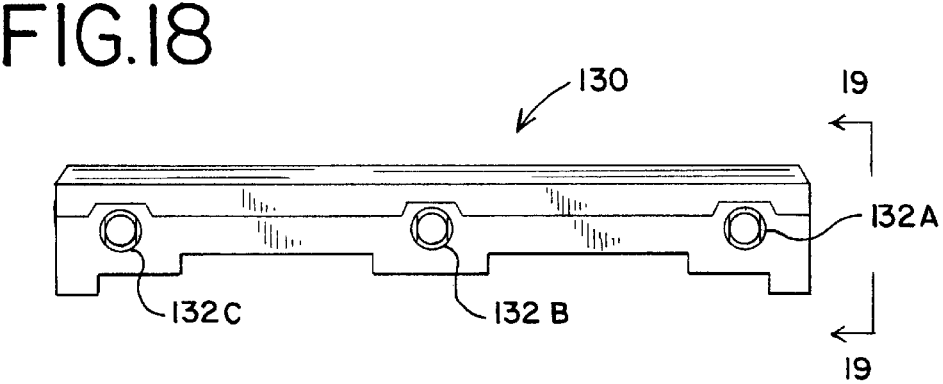
FIG. 18 is a front elevational view of the support block of FIG. 17.
Figure 19:
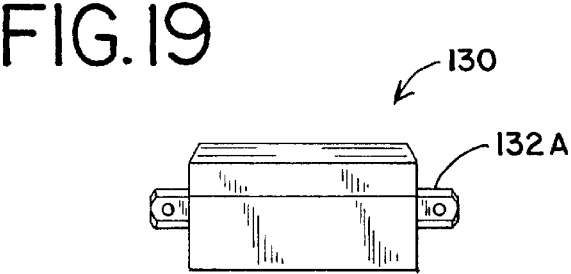
FIG. 19 is a side elevational view taken along line 18—18 of FIG. 17.

FIGS. 17–19 show a modified embodiment of a support block identified with the reference number 130. The support block 130 is constructed substantially identical to the support blocks 30A–B except the support block 130 includes three parallel and spaced apart shafts 132A–C. Each shaft 132A–C is constructed in the same manner as the shaft 44A. When the support apparatus includes two support blocks 130, three idler strings extend respectively between the shafts 132A–C of the support blocks 130. Similarly, the restraining assembly that resiliently attaches each support block 130 to a stationary member includes three biasing members and three tongue members respectively attached to each shaft 132A–C. The number of shafts utilized in any particular application may be varied depending on the load and support requirements.

Figure 20:
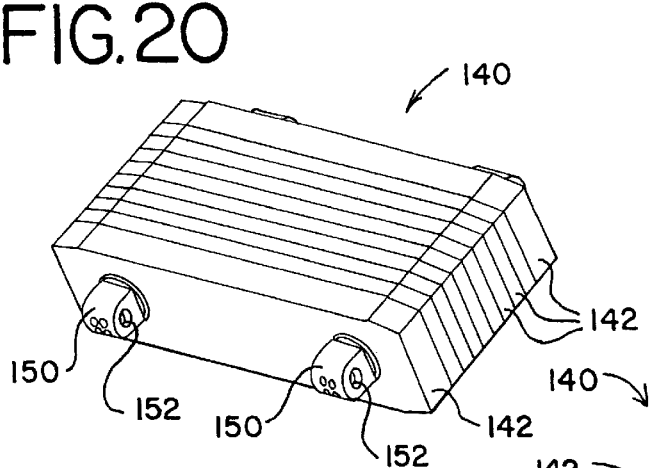
FIG. 20 is a perspective view of another modified embodiment of a support block.
Figure 21:
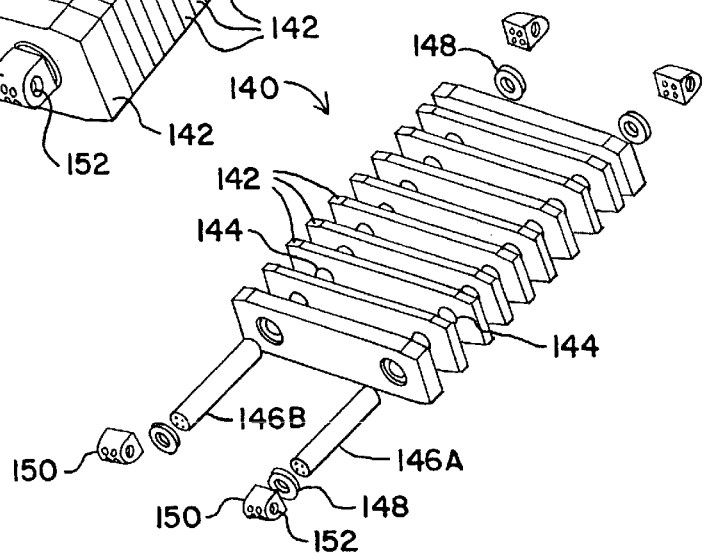
FIG. 21 is an exploded view of the support block of FIG. 20.

FIGS. 20 and 21 show another modified embodiment of a support block identified with the reference number 140. The support block 140 includes a plurality of generally rectangular and plate-like slabs 142. Each slab 142 includes first and second generally planar surfaces that are spaced apart and parallel to one another. Each slab 142 includes a pair of spaced apart apertures 144 that extend from the first surface to the second surface. The apertures 144 in the slabs 142 that are located at each end of the support block 140 include a countersunk recess. The slab 142 at each end of the support block 140 preferably includes a chamfered edge (not shown), such as the chamfered edge 67 as shown in FIGS. 14 and 15, to assist in guiding the edge of the belt 22 onto the top surface of the support block 140. The slabs 142 are located adjacent to one another such that the apertures 144 in each slab 142 are in alignment and such that the slabs 142 form a support body having a top support surface for supporting the conveyor belt 22.

Shafts 146A–B respectively extend through the pair of apertures 144 in the slabs 142. A washer 148 is located in the recess in each end slab and extends around a respective shaft 146A–B. Each end of the shafts 146A–B includes a connector member 150 having a bore 152. The connector members 150 engage the washers 148 and secure the slabs 142 tightly together.

The slabs 142 may be formed in various different thicknesses between the first and second surfaces as desired, and the slabs in the support block 140 may have different thicknesses. The slabs 142 may be formed from various materials such as urethane, rubber, nylon, ultra high molecular weight polyethylene or polyurethane. Respective slabs 142 in the support block 140 may be made of different materials. For example, a first slab may be formed from polyethylene, the adjacent slab may be formed from rubber, and the next adjacent slab may be formed from polyurethane. Such alternating use of materials that form the slabs 142 may be continued through the support block 140. Use of the slabs 142 to form the support block 140 lowers the cost of manufacturing the support block as different materials do not need to be molded together, and as the slabs can be cut from more readily available sheets of material to thereby reduce material costs. The length of the support body can be altered by changing the number of slabs, or thickness of the slabs, used in the support body.

Figure 22:
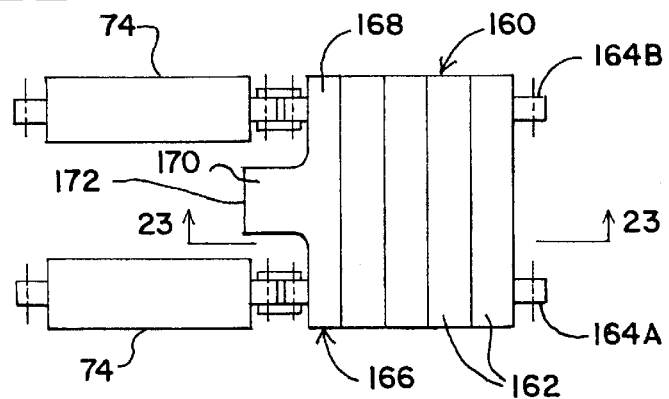
FIG. 22 is a plan view of a further modified embodiment of a support block having a finger and shown connected to idler rollers.
Figure 23:
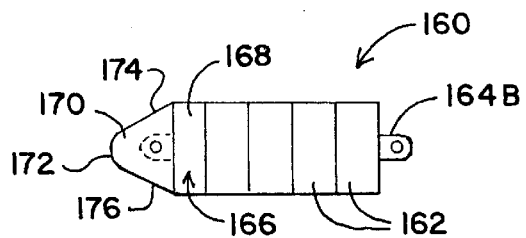
FIG. 23 is a cross sectional view of the support block taken along line 23—23 of FIG. 22.

FIGS. 22 and 23 show a further modified embodiment of a support block identified with the reference number 160. The support block 160 is constructed similarly to the support block 140 in that it includes a plurality of slabs 162 that are placed adjacent to one another to form the support body of the support block 160. The slabs 162 include a plurality of apertures that are adapted to respectively receive shafts 164A–B. The shafts 164A–B are constructed similarly to the shafts 146A–B. The support block 160 includes an end slab 166 at the end of the support block 160 that is adapted to be located adjacent to the idler rollers 74 as shown in FIG. 22. The end slab 166 includes a generally rectangular base 168 that is constructed in the same general manner as the slabs 162. However, the end slab 166 includes a finger 170 that extends outwardly from the front face of the base 168. The finger 170 extends from the base 168 to a tip 172. The finger 170 is sufficiently long such the tip 172 is adapted to be located between the idler rollers 74 as shown in FIG. 22. The finger 170 includes an inclined surface 174 that extends downwardly from the top surface of the support block 160 toward the tip 172. The finger 170 also includes an inclined surface 176 that extends upwardly from the bottom surface of the support block 160 toward the tip 172. The finger 170 is located midway between the ends of the base 168 and generally midway between the shafts 164A–B. The finger 170 is adapted to guide the conveyor belt 22 onto the top surface of the support block 160 should the conveyor belt 22 become sufficiently misaligned to move off the top surface of the support block 160.

In operation, movement of the idler rollers 74 of the idler strings 70 and 72 is restricted by their respective attachment to the shafts 44A–B which are stationarily attached with respect to one another as part of the support blocks 30A–B. Movement of the support blocks 30A–B and of the idler rollers 74 of the idler string 70 and 72 is also restricted or inhibited by the biasing members 114A–B. The biasing members 114A–B absorb forces that result from restricting movement of the support blocks 30A–B and of the idler rollers 74. The support blocks 30A–B also aid in the absorption of some of the impact forces applied to the belt 22 due to the flexibility of the support blocks between the shafts 44A and B. The size of the support blocks 30A–B is determined by the dimensions of the idler rollers 74. The support blocks 30A–B are preferably approximately the same thickness as the idler rollers 74. Movement of the support blocks 30A–B can be limited to approximately plus or minus one-half inch, which enables the edges 24 of the belt 22, which are supported by the support blocks 30A–B, to be sealed by a skirt board or the like to substantially reduce the escape of conveyed material from the belt. The support apparatus 20 of the present invention also assists in restricting the movement of the idler rollers 74 of the idler strings 70 and 72 to a direction that is generally perpendicular to the conveyor belt and thereby greatly reduces mistracking of the conveyor belt 22. It is to be understood that as used herein, references to restricting, limiting or inhibiting movement of the idler rollers 74 does not mean restricting, limiting or inhibiting rotational movement of the idler rollers 74 about their central axes.

Various features of the invention have been particularly shown and described in connection with the illustrated embodiments of the invention however, it must be understood that these particular arrangements merely illustrate, and that the invention is to be given its fullest interpretation within the terms of the appended claims.

What is claimed is:

1. A conveyor belt support apparatus for supporting a conveyor belt having a first edge and a second edge, said conveyor belt support apparatus including:

a first support block having a top surface for supporting the first edge of the conveyor belt;

a second support block having a top surface for supporting the second edge of the conveyor belt, said second support block being spaced apart from said first support block;

a first idler string suspended between and supported by said first support block and said second support block, said first idler string including one or more idler rollers for supporting the conveyor belt; and a second idler string suspended between and supported by said first support block and said second support block, said second idler string including one or more idler rollers for supporting the conveyor belt;

whereby movement of said idler rollers of said first idler string is restricted by said first and second support blocks to inhibit misalignment of said idler rollers while permitting rotational movement of said idler rollers in contact with the conveyor belt, and movement of the first and second side edges of the conveyor belt is restricted by said first and second support blocks to reduce the escape of conveyed material from the conveyor belt.

2. The conveyor belt support apparatus of claim 1 wherein said first support block includes a support body, a first shaft extending through said support body, and a second shaft extending through said support body, said first idler string being attached to said first shaft and said second idler string being attached to said second shaft.

3. The conveyor belt support apparatus of claim 2 wherein said support body includes a base member and a top member, said first and second shafts extending through said base member, said top member including said top surface.

4. The conveyor belt support apparatus of claim 2 wherein said support body includes a plurality of slabs located adjacent to one another, said first and second shafts extending through said slabs.

5. The conveyor belt support apparatus of claim 1 wherein said first support block includes one or more wear resistant inserts which form a portion of said top surface.

6. The conveyor belt support apparatus of claim 1 including a restraining assembly attached to said first support block.

7. The conveyor belt support apparatus of claim 1 including a resilient biasing member having a first end attached to said first support block and a second end adapted to be attached to an anchor member.

8. The conveyor belt support apparatus of claim 7 wherein said biasing member comprises a resilient tether.

9. A conveyor belt support apparatus for supporting a conveyor belt including:

an idler string including a plurality of idler rollers for rotatably supporting the conveyor belt; and a first resilient biasing member having a first end attached to said idler string and a second end adapted to be attached to an anchor member;

whereby said first resilient biasing member inhibits misalignment of said idler rollers of said idler string during loading of the conveyor belt but permits rotational movement of said idler rollers.

10. The conveyor belt support apparatus of claim 9 wherein said biasing member comprises a resilient tether.

11. The conveyor belt support apparatus of claim 9 including a coupler member attached to said idler string, said first end of said biasing member being attached to said coupler member.

12. The conveyor belt support apparatus of claim 11 including a support block attached to said coupler member, said support block including a top surface adapted to support the conveyor belt.

13. The conveyor belt support apparatus of claim 9 including a second resilient biasing member having a first end attached to the idler string and a second end adapted to be attached to an anchor member.

14. The conveyor belt support apparatus of claim 9 including a connector member attached to said second end of said biasing member, said connector member including a plurality of attachment points for selectively connecting said connector member to the anchor member.

15. A conveyor belt support apparatus for supporting a conveyor belt having a first edge and a second edge, said conveyor belt support apparatus including:

a first outside support block having a top surface for supporting the first edge of the conveyor belt;

a second outside support block having a top surface for supporting the second edge of the conveyor belt; and an inside support block suspended between and supported by said first outside support block and said second outside support block, said inside support block having a top surface for supporting the conveyor belt.

16. The conveyor belt support apparatus of claim 15 including a plurality of inside support blocks suspended between and supported by said first outside support block and said second outside support block.

17. A conveyor belt support apparatus for supporting a conveyor belt having a first edge and a second edge, said conveyor belt support apparatus including:

a first support block having a top surface for supporting the first edge of the conveyor belt, said first support block including one or more wear resistant inserts which form a portion of said top surface;

a second support block having a top surface for supporting the second edge of the conveyor belt, said second support block being spaced apart from said first support block; and a first idler string suspended between and supported by said first support block and said second support block, said first idler string including one or more idler rollers for supporting the conveyor belt;

whereby movement of said idler rollers of said first idler string is restricted by said first and second support blocks to inhibit misalignment of said idler rollers while permitting rotational movement of said idler rollers in contact with the conveyor belt, and movement of the first and second side edges of the conveyor belt is restricted by said first and second support blocks to reduce the escape of conveyed material from the conveyor belt.

18. A conveyor belt support apparatus for supporting a conveyor belt having a first edge and a second edge, said conveyor belt support apparatus including:

a first support block having a top surface for supporting the first edge of the conveyor belt;

a second support block having a top surface for supporting the second edge of the conveyor belt, said second support block being spaced apart from said first support block;

a first idler string suspended between and supported by said first support block and said second support block, said first idler swing including one or more idler rollers for supporting the conveyor belt; and a restraining assembly attached to said first support block;

whereby movement of said idler rollers of said first idler string is restricted by said first and second support blocks to inhibit misalignment of said idler rollers while permitting rotational movement of said idler rollers in contact with the conveyor belt, and movement of the first and second side edges of the conveyor belt is restricted by said first and second support blocks to reduce the escape of conveyed material from the conveyor belt.

19. A conveyor belt support apparatus for supporting a conveyor belt having a first edge and a second edge, said conveyor belt support apparatus including:

a first support block having a top surface for supporting the first edge of the conveyor belt;

a second support block having a top surface for supporting the second edge of the conveyor belt, said second support block being spaced apart from said first support block;

a first idler string suspended between and supported by said first support block and said second support block, said first idler string including one or more idler rollers for supporting the conveyor belt; and a resilient biasing member having a first end attached to said first support block and a second end adapted to be attached to an anchor member;

whereby movement of said idler rollers of said first idler string is restricted by said first and second support blocks to inhibit misalignment of said idler rollers while permitting rotational movement of said idler rollers in contact with the conveyor belt, and movement of the first and second side edges of the conveyor belt is restricted by said first and second support blocks to reduce the escape of conveyed material from the conveyor belt.

\* \* \* \* \*